(12) United States Patent
Jacobson (10) Patent No.: US 11,017,465 B2
(45) Date of Patent: May 25, 2021

(54) OLED-BASED SECURE MONITORING OF VALUABLES

(71) Applicant: Bank of America Corporation, Charlotte, NC (US)

(72) Inventor: William P. Jacobson, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 95 days.

(21) Appl. No.: 16/792,532

(22) Filed: Feb. 17, 2020

(65) Prior Publication Data

US 2020/0250746 A1 Aug. 6, 2020

Related U.S. Application Data

(62) Division of application No. 15/206,470, filed on Jul. 11, 2016, now Pat. No. 10,580,068.

(51) Int. Cl.

| | |
|---|---|
| *G09G 3/3208* | (2016.01) |
| *G09G 3/3225* | (2016.01) |
| *G06Q 20/40* | (2012.01) |
| *G07F 17/10* | (2006.01) |
| *H04N 5/232* | (2006.01) |
| *H04N 7/18* | (2006.01) |
| *G06Q 40/02* | (2012.01) |
| *G07F 19/00* | (2006.01) |
| *G09G 3/3283* | (2016.01) |

(52) U.S. Cl.
CPC ....... *G06Q 40/02* (2013.01); *G06Q 20/40145* (2013.01); *G07F 17/105* (2013.01); *G07F 19/209* (2013.01); *G09G 3/3208* (2013.01); *G09G 3/3225* (2013.01); *H04N 5/23293* (2013.01); *G09G 3/3283* (2013.01); *H04N 7/185* (2013.01)

(58) Field of Classification Search
CPC ............ G06Q 40/02; G06Q 20/40145; H04N 5/23293; H04N 7/185; G09G 3/3225; G09G 3/3208; G09G 3/3283; G07F 17/105; G07F 19/209
See application file for complete search history.

(56) References Cited

U.S. PATENT DOCUMENTS

| | | | | |
|---|---|---|---|---|
| 8,810,816 | B2* | 8/2014 | Fischer | G06K 19/077 358/1.13 |
| 9,141,876 | B1* | 9/2015 | Jones | G06K 9/00442 |
| 9,230,380 | B2* | 1/2016 | Marsden | G07C 9/00563 |

(Continued)

*Primary Examiner* — Boubacar Abdou Tchoussou
(74) *Attorney, Agent, or Firm* — Weiss & Arons LLP; Michael A. Springs, Esq.

(57) ABSTRACT

A method for enhancing security of a receptacle for valuables may be provided. The method may include placing currency in the receptacle. The receptacle may include an integral OLED display. The OLED display may occupy a portion of the receptacle. The OLED display may form a portion of the receptacle. The OLED display may be visible from a viewpoint external to the receptacle. The method may include capturing one or more biometric characteristics on a pressure-sensitive portion of the OLED display. The method may include storing the captured biometric characteristics on a software chip of the OLED display. The method may include transmitting the captured biometric characteristics via a communication circuit of the OLED display.

6 Claims, 7 Drawing Sheets

(56) References Cited

U.S. PATENT DOCUMENTS

| | | | |
|---|---|---|---|
| 9,286,455 B2* | 3/2016 | Senthurpandi | H04L 63/0861 |
| 9,558,418 B2* | 1/2017 | Jones | G06K 9/20 |
| 2009/0298546 A1* | 12/2009 | Kim | G06F 1/1686 |
| | | | 455/566 |
| 2011/0199183 A1* | 8/2011 | Marsden | G07C 9/00563 |
| | | | 340/5.52 |
| 2012/0268762 A1* | 10/2012 | Fischer | G06K 19/07703 |
| | | | 358/1.13 |
| 2014/0101453 A1* | 4/2014 | Senthurpandi | G06F 21/32 |
| | | | 713/172 |
| 2015/0356366 A1* | 12/2015 | Jones | G07D 11/125 |
| | | | 382/135 |
| 2016/0197919 A1* | 7/2016 | Senthurpandi | H04L 63/0853 |
| | | | 713/186 |
| 2016/0219046 A1* | 7/2016 | Ballard | H04L 63/0861 |
| 2017/0098134 A1* | 4/2017 | Jones | G07D 11/50 |

* cited by examiner

OLED-BASED SECURE MONITORING OF VALUABLES

CROSS REFERENCE TO RELATED APPLICATION

This application is a divisional of U.S. patent application Ser. No. 15/206,470 filed on Jul. 11, 2016 and entitled "OLED-BASED SECURE MONITORING OF VALUABLES," which is hereby incorporated by reference herein in its entirety.

FIELD OF THE DISCLOSURE

This invention relates to monitoring of valuables.

BACKGROUND OF THE DISCLOSURE

Entities may require transfer of valuable goods from an originating location to a destination location. Conventionally, monitoring of valuables in transport has been difficult. The valuables may change hands numerous times during transportation. During transportation, a valuable item may be lost, stolen or damaged. The loss may only be determined at the destination location. At that point, it may be difficult to determine who the responsible party was at the time of the loss. The difficulties may arise because numerous parties were involved in the transportation process.

It may be desirable to utilize OLED ("Organic light emitting diode") technology to enhance the security of monitoring of valuables.

SUMMARY OF THE DISCLOSURE

Aspects of the invention relate to ATM ("automated teller machine") cartridges, containers, bags, smart bags, boxes, safety deposit boxes and other receptacles for containing valuables. Aspects of the invention relate to enhancing security of the receptacles. Enhancements to the security of the receptacles may include OLED displays integral to the receptacles.

An automated teller machine ("ATM") cartridge may be provided. The ATM cartridge may include an internal cavity. The internal cavity may be configured to hold currency.

The ATM cartridge may also include an integral OLED display. The integral OLED display may be permanently affixed to the ATM cartridge. The integral OLED display may be viewable from a viewpoint external to the ATM cartridge.

The ATM cartridge may include a pressure-sensitive portion. The pressure-sensitive portion may be configured to capture one or more biometric characteristics.

The ATM cartridge may also include software chip. The software chip may be configured to store the captured biometric characteristic. The captured biometric characteristic may be stored as an image, an array of pixels, or any other suitable data structure.

The ATM cartridge may also include a communication circuit. The communication circuit may be configured to transmit the stored biometric characteristic.

The ATM cartridge may also include a battery. The battery may be configured to power the OLED display, the pressure-sensitive portion, the software chip and the communication circuit. The battery may be a rechargeable battery. The battery may be a light-powered or solar-powered battery.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Aspects of the invention relate to ATM cartridges, containers, bags, smart bags, boxes, safety deposit boxes and other receptacles for containing valuables. The valuables may include jewelry, cash, currency, coins, precious jewels, precious metals, important documents or any other suitable valuable.

Aspects of the invention relate to enhancing security of the receptacles. Enhancements to the security of the receptacles may include OLED displays integral to the receptacles.

A receptacle for holding valuables may be provided. The receptacle may include an internal cavity. The receptacle may also include an integral OLED display permanently affixed to the receptacle. The integral OLED display may be viewable from a viewpoint external to the receptacle.

In some embodiments, the receptacle itself may be an OLED display. In some of these embodiments, the receptacle may be a plastic bag. The plastic bag may be an OLED display.

The receptacle may include a pressure-sensitive portion. The pressure-sensitive portion may be configured to capture a biometric characteristic. The captured biometric characteristic may be a fingerprint, toeprint, or any other suitable biometric characteristic.

The receptacle may include a software chip. The software chip may include a processor. The software chip may include a memory. The memory may be non-transitory. The memory may be non-volatile. The software chip may be configured to store the captured biometric characteristic. The software chip may be configured to store any other suitable information.

The receptacle may include a communication circuit. The communication circuit may be configured to transmit the stored biometric characteristic. The communication circuit may communicate with a secure entity hub. The communications may be Wi-Fi, cellular, NFC (near field communication) or any other suitable communication method.

The communication circuit may also be configured to receive communications. The received communications may include approval of the transmitted biometric characteristic. The received communications may include denial of the transmitted biometric characteristic. The received communications may include any other suitable communications.

In certain embodiments, the software chip may store a date time value. The date time value may be the date time of the receipt of the biometric characteristic. The communication circuit may transmit the date time value to the secure entity hub together with the biometric data. The secure entity hub may store the biometric data with the date time value. Storing the biometric data together with the date time value may enable the secure entity hub to know who was responsible for the valuables at each moment in time. In the event of theft or loss of the valuables, the secure entity hub may have clear records of the party responsible for the valuables.

In some embodiments, the receptacle may be constructed from opaque material. In these embodiments, the OLED display may occupy a portion of the receptacle. In these embodiments, the OLED display may be configured to be transparent when idle not powered on. The transparency of the OLED display may enable a user to view contents of the receptacle.

In some embodiments, when the receptacle itself is an OLED display, as described above, the receptacle may be transparent. Transparency of the receptacle may enable a user to view contents of the receptacle. Other times, the OLED display may be powered on and cause the receptacle to become opaque. A user may desire that the receptacle become opaque for privacy concerns, security concerns or any other suitable reason.

In some embodiments, the receptacle may include a camera. The camera may be positioned in the receptacle's internal cavity. The receptacle may also include a light source. The light source may also be positioned in the receptacle's internal cavity. The light source may be a light bulb, LED light, window or any other suitable light source. The camera may utilize the light source to photograph contents of the receptacle's internal cavity.

The software chip may be configured to store a photograph captured by the camera. The software chip may also be configured to store a date time value associated with the photograph capture time. The communication circuit may transmit the stored photograph and the date time value to the secure entity hub.

In some embodiments, the OLED display may be configured to display the photograph. The display of the photograph may enable a user to view the contents of the receptacle without opening the receptacle. This embodiment may be useful when the receptacle is opaque.

In some embodiments, the communication circuit may receive a photograph of a person who is expected to retrieve the receptacle. The OLED display may display the received photograph. The person who is delivering the receptacle may view the displayed photograph on the receptacle to ensure that the person retrieving the receptacle is indeed the person designated to receive the receptacle.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
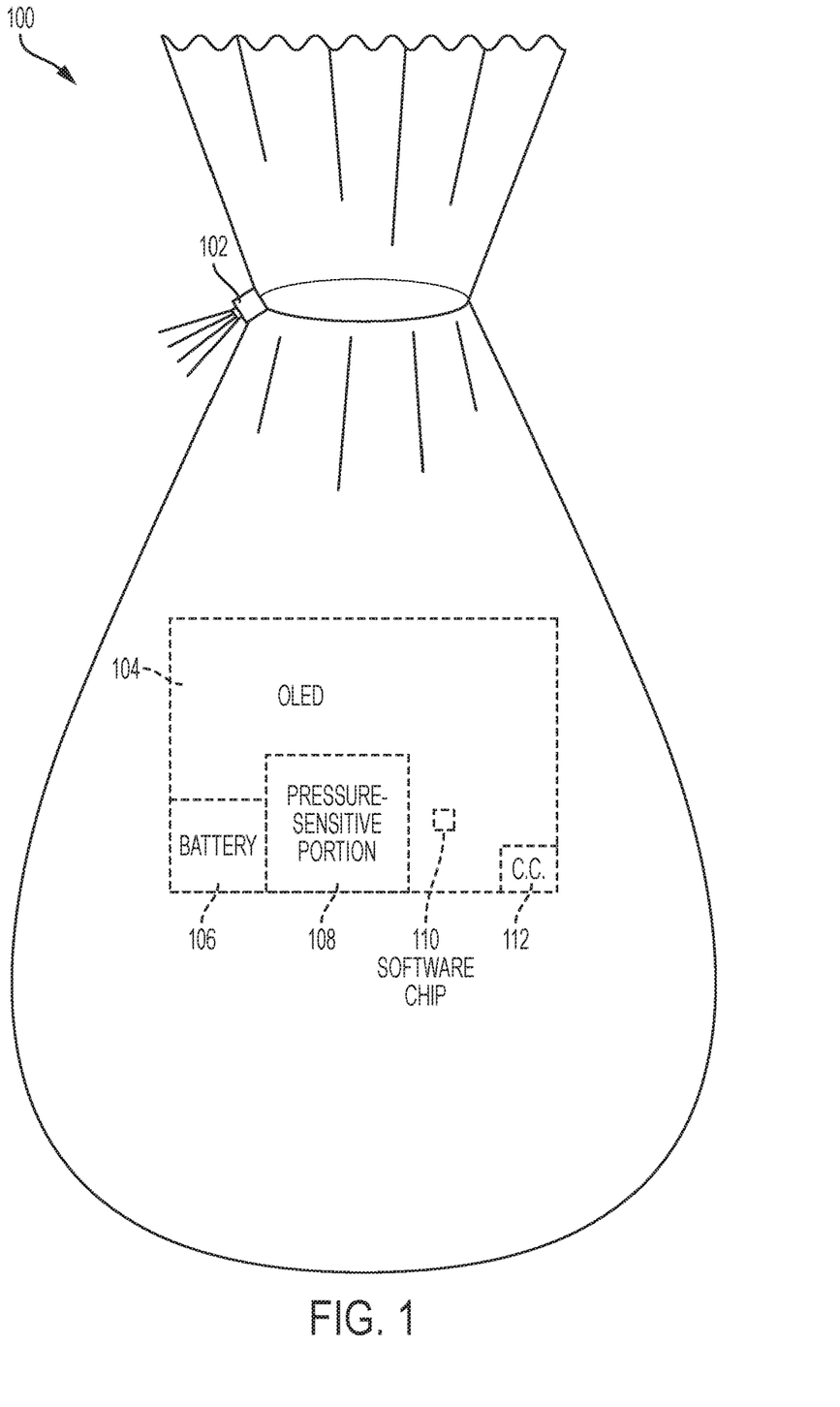
FIG. 1 shows a view of an illustrative OLED-based currency bag.

FIG. 1 shows a transparent view of illustrative OLED-based currency deposit bag 100. The bag may include tie 102. Tie 102 may close the mouth of bag 100. Currency and/or valuables may be present in bag 100. Bag 100 may include OLED display 104.

In some embodiments, OLED display 104 may be embedded in bag 100. In other embodiments, OLED display 104 may be inserted into a sealable pocket of bag 100. The pocket may be preferably transparent. In yet other embodiments, OLED display 104 may occupy a portion of bag 100.

OLED display 104 may include pressure-sensitive portion 108. Pressure-sensitive portion 108 may capture the biometric characteristics of a user. Pressure-sensitive portion 108 may also capture a signature of a user.

In some embodiments, pressure-sensitive portion 108 may be a film covering OLED display 104. In some embodiments, a user may be unaware that a pressure-sensitive film exists on OLED display 104. This may enable capture of the user's biometric characteristics without the user's knowledge.

In some embodiments, a receptacle for valuables may be constructed from an OLED display. The OLED display may have a pressure-sensitive film or biometric characteristic receipt film. The pressure-sensitive film or biometric characteristic receipt film may capture the biometric characteristics of a user without a user's knowledge.

OLED display 104 may also include software chip 110. Software chip 110 may include a memory and a processor. Software chip 110 may control communication circuit 112, pressure-sensitive portion 108, battery 106 and OLED display 104.

Battery 106 may power OLED display 104, pressure-sensitive portion 108, software chip 110 and communication circuit 112. Battery 106 may be rechargeable. Battery 106 may be solar-powered. Battery 106 may be light-powered.

Communication circuit 112 may communicate with an entity. The entity may be remote from bag 100. Communication circuit 112 may be able to communicate via Wi-Fi, cellular signals, radio waves or any other suitable communication method.

Software chip 110 may instruct communication circuit 112 to scan for a communication network. In response to detecting a communications network, software chip 110 may instruct the communication network to transmit a request to a destination. The destination may be the secure entity hub. The request may include requesting a photograph of the person expected to retrieve the valuables.

Figure 2:
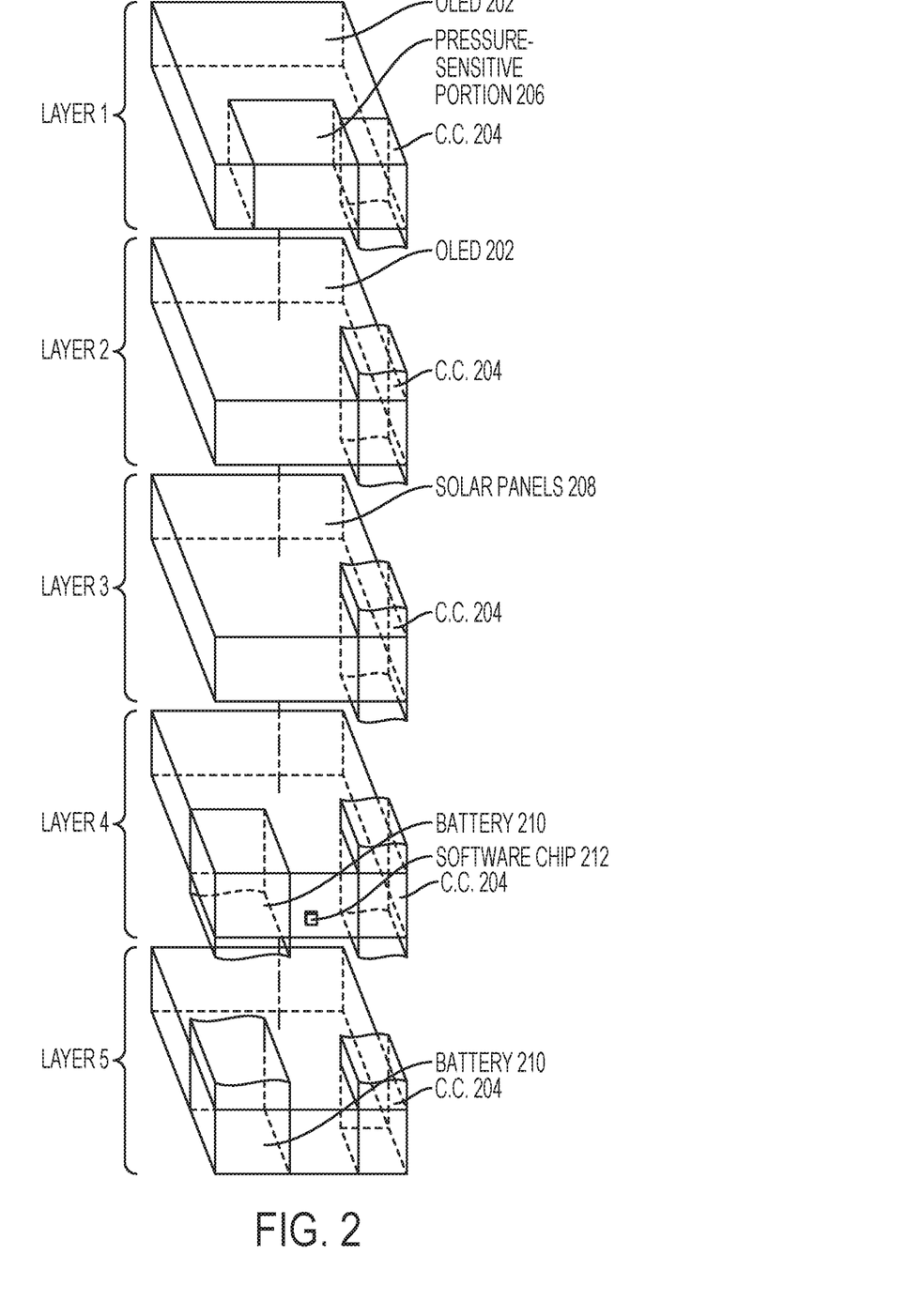
FIG. 2 shows a layered view of an illustrative integral OLED display.

FIG. 2 shows a layered view of an illustrative integral OLED display for use in certain embodiments. The layers shown may be present within an illustrative OLED display. Layer 1 may include OLED layer 202. FIG. 2 also shows that, in some embodiments, communication circuit 204 may penetrate layer 1. FIG. 2 also shows that, in some embodiments, pressure-sensitive portion 206 may penetrate layer 1.

Layer 2 may include OLED layer 202. FIG. 2 also shows that, in some embodiments, communication circuit 204 may penetrate layer 2.

Layer 3 may include solar panels 208. Solar panels 208 may be used to power various components of an integral OLED display. FIG. 2 also shows that, in some embodiments, communication circuit 204 may penetrate layer 3.

Layer 4 may include battery 210. Battery 210 may include one or features of battery 106 (shown in FIG. 1). Layer 4 may also include software chip 212. Software chip 212 may include one or more features of software chip 110 (shown in FIG. 1). FIG. 2 shows that, in some embodiments, communication circuit 204 may penetrate layer 4.

Layer 5 may include battery 210 and communication circuit 204. FIG. 2 shows that, in some embodiments, battery 210 and communication circuit 204 may penetrate layer 5.

Figure 3:
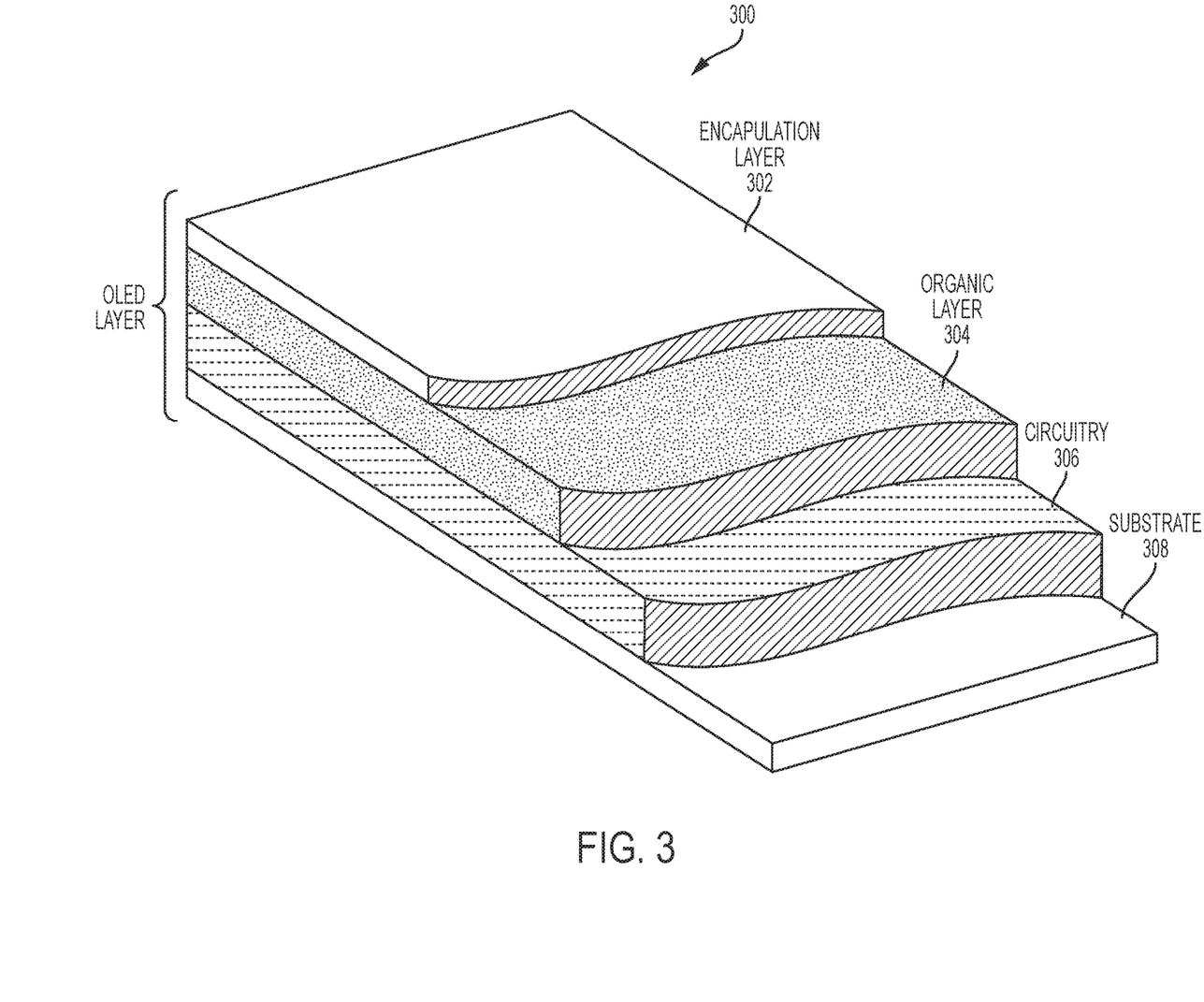
FIG. 3 shows a cut-away view of an illustrative OLED layer.

FIG. 3 shows structures 300 of an illustrative OLED layer, such as OLED layer 1 (shown in FIG. 2). Structures 300 include four layers: encapsulation layer 302, organic layer 304, circuitry layer 306 and substrate layer 308.

Encapsulation layer 302 protects the OLED layer from exposure to oxygen, water and other contaminants. Preferably, encapsulation layer 302 is flexible and transparent. Glass is a typical material for constructing encapsulation layer 302. When glass is used to construct encapsulation layer 302, the glass may be very thin and flexible. For example, the glass may be between 50 micrometers (μm) and 100 μm thick.

In some embodiments, encapsulation layer 302 may be constructed using thin-film encapsulation techniques such as Atomic Layer Deposition ("ALD"). ALD is a process that utilizes chemicals that, when deposited on a material, react to create a solid, thin film.

Structures 300 include organic layer 304.

Organic layer 304 typically includes an emissive solid-state semiconductor. Organic layer 304 may be constructed from a thin film of organic (carbon-based) material. For example, organic layer 304 may include one or more OLEDs. When electricity is applied to an OLED within organic layer 304, electrons flow through organic layer 304 and release photons, thereby emitting light. Different types of emissive materials may be used. Each type of material may be associated with a different color light. An intensity of light emitted by organic layer 304 may be controlled by the amount of electricity flowing through organic layer 304.

Organic layer 304 may be doped with "host" materials. Host material may affect properties, such as power efficiency, of organic layer 304. For example, organic layer 304 may be doped with emitter materials that improve its operation and/or achieve a desired color.

Organic layer 304 may include two or more sub-layers (not shown). For example, organic layer 304 may include 5, 10 or 15 sublayers. Illustrative sub-layers may include: (1) an electron transport layer, (2) a blocking layer, (3) an emissive layer, (4) a hole transport layer and (5) an injection layer. The sub-layers may enhance an efficiency of the emissive layer.

For example, an emissive layer may be placed between a cathode and an anode. When electricity is applied, electrons flow from the cathode to the anode. OLED displays may be driven by either electrical current or voltage. In a preferred embodiment, the OLED display is driven by current. The cathode inserts electrons into the emissive layer, and the anode removes the electrons. The electron "flow" through the emissive layer releases photons, generating light. The color of the generated light may be changed by including different types of materials within the emissive layer.

A direction of light emitted by the organic layer may be controlled by a degree of transparency of the anode and/or cathode. In some embodiments, a cathode may be reflective. Such a cathode may be constructing using an aluminum based-compound or lithium fluoride. An anode may be transparent. A transparent anode may preferably be constructed using indium tin oxide. In such embodiments, when current flows between the cathode and anode, light is emitted through circuitry layer 306 and substrate 308. Circuitry layer 306 and substrate 308 may be transparent. Such embodiments may be referred to as "bottom-emitting OLEDs."

In some embodiments, the cathode may be transparent. Such a cathode may preferably be constructed using indium tin oxide. The anode may be reflective. The reflective anode may direct light toward the transparent cathode. Such embodiments may be referred to as "top-emitting OLEDs." Typically, top-emitting designs are more efficient and are used to construct higher resolution displays.

Additionally, top-emitting designs may allow organic layer 304 to be formed on a non-transparent substrate. Small- and medium-sized OLED displays (e.g., 1-7 inches) are typically constructed using top-emitting techniques.

Organic layer 304 may form one or more pixels. Different architectures are available for forming pixels using OLEDs. One architecture includes positioning different color (e.g., red, green and blue) OLEDs adjacent to each other. Another architecture may include stacking different color OLEDs on top of each other. OLEDs may be stacked because materials used to construct organic layer 304 may be transparent. A stacked design may provide a smaller pixel size and higher resolution.

Structures 300 include circuitry layer 306. Circuitry layer 306 includes electronics that drive one or more pixels formed within organic layer 304. Preferably, amorphous silicon ("a-Si") and low temperature polysilicon ("LTPS") may be used to construct circuitry layer 306. In some embodiments, circuitry layer 306 may be transparent.

Substrate layer 308 supports circuitry layer 306, organic layer 304 and encapsulation layer 302. Substrate layer 308 may be constructed using various materials. For example, substrate layer 308 may be constructed using glass, plastic or metal materials. In some embodiments, such as in bottom-emitting OLEDs, substrate layer 308 may function as encapsulation layer 302.

Figure 4A:
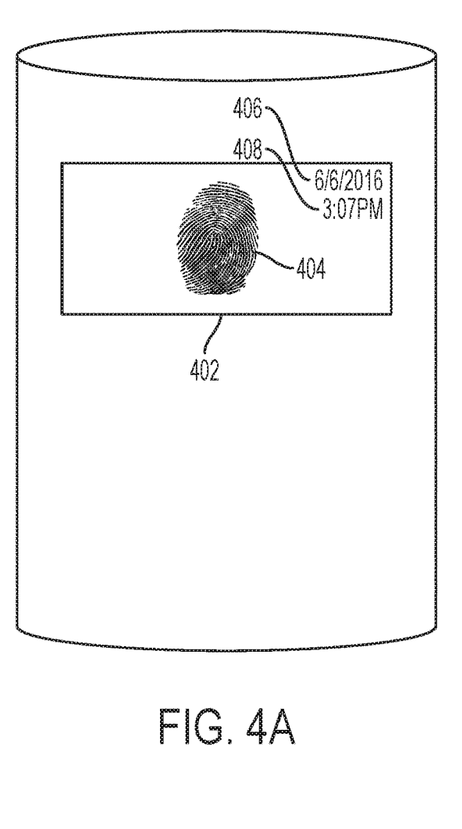
FIGS. 4A-C show several states of an illustrative OLED-based currency bag.
Figure 4B:
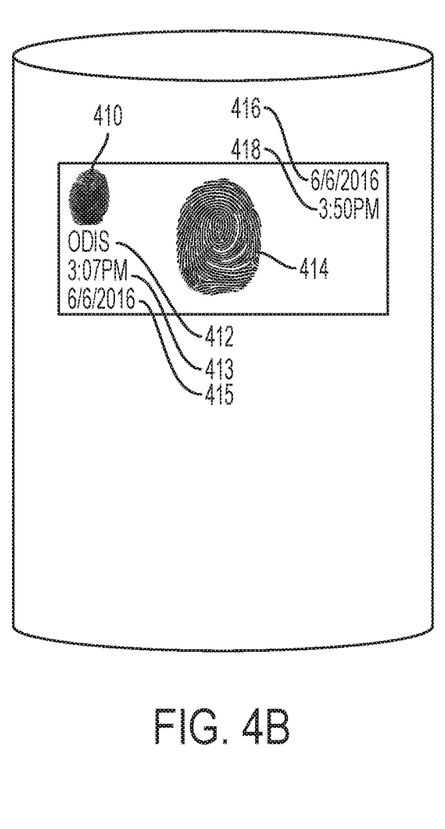
Figure 4C:
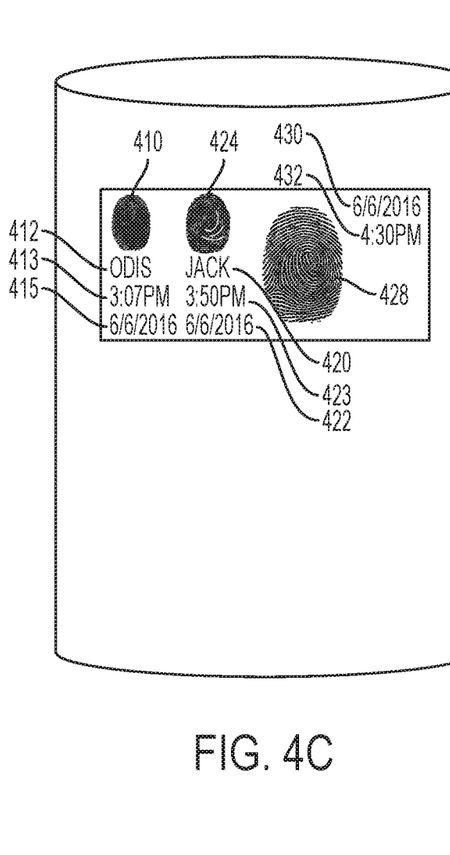

FIGS. 4A-C shows several states of an illustrative OLED-based currency deposit bag. FIG. 4A shows the currency deposit bag with OLED display 402. OLED display 402 may include a pressure-sensitive portion (not shown). The pressure-sensitive portion may capture the fingerprint of a person who handles the currency deposit bag. OLED display 402 may display the captured fingerprint, shown at 404. OLED display 402 may also display the date (shown at 406) and the current time (shown at 408).

At 3:50 PM (shown at 418) on Jun. 6, 2016 (shown at 416), the currency deposit bag may have been transmitted to another person. At the time of the transfer, OLED display 402 may display the fingerprint of the person who previously handled the bag (shown at 410), the name of the person who previously handled the bag (shown at 412) and the date (shown at 415) and time (shown at 413) that the person, who previously handled the bag, received the bag. Also, at the time of transfer, OLED display 402 may display the current date (shown at 416) and the current time (shown at 418). OLED display 402 may instruct the receiver of the bag to place his or her fingerprint on the bag. OLED display 402 may transmit the captured fingerprint to a secure entity hub. The secure entity hub may verify that the captured fingerprint is indeed of the correct person. At times, the OLED display may display the captured fingerprint (shown at 414) to inform the person who previously handled the bag that this is indeed the correct person to receive the bag. Other times, OLED display 402 may display a message informing the person who previously handled the bag whether the captured fingerprint matches the fingerprint of the person who is expected to receive the bag.

FIG. 4C shows another state of the currency deposit bag. OLED display 402 may display the current date (shown at 430), the current time (shown at 432) and a fingerprint of the person who is supposed to receive the bag (shown at 428). The OLED display may also display the fingerprints of the previous handlers of the bag (shown at 410 and 424) as well as name (shown at 412 and 420), time (shown at 413 and 423) and date (shown at 415 and 422) information of the previous handlers of the bag.

Figure 5A:
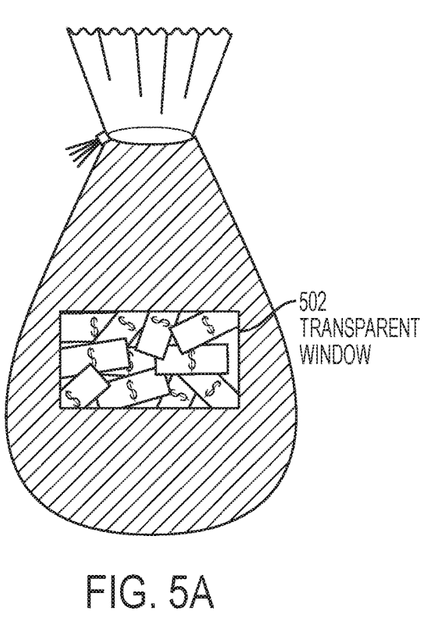
FIGS. 5A-B show several states of another illustrative OLED-based currency bag.
Figure 5B:
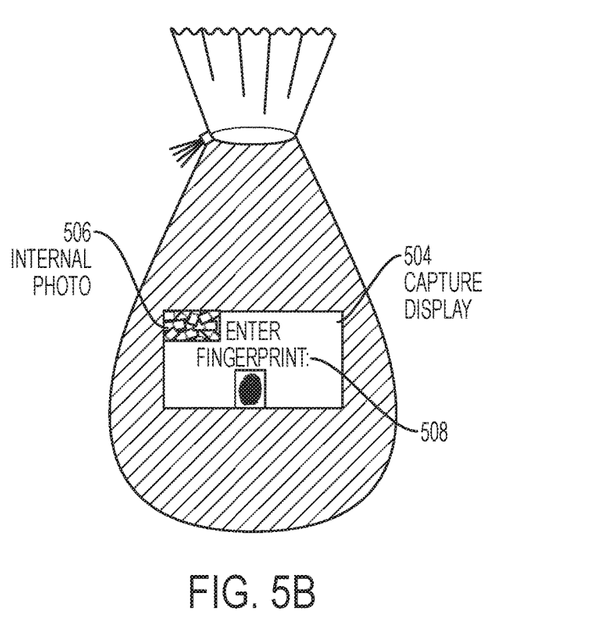

FIGS. 5A-B show several states of a currency deposit bag with an OLED display. The currency deposit bag may be constructed from opaque material. The currency deposit bag may include a camera and a light source located on an internal cavity of the currency deposit bag.

The OLED display may form a portion of the bag. When the OLED display is idle, or not in use, the OLED display may be transparent. The transparency may enable a user to view the contents of the bag, as shown at 502 in FIG. 5A.

The internal camera may photograph the contents of the bag. Prior to fingerprinting the bag, the receiver of the bag may view the photograph on the OLED display to ensure that the valuables contained inside the bag are indeed the expected valuables. FIG. 5B shows photograph 506 displayed on display 504. Also shown are instructions to enter a fingerprint, at 508.

Figure 6A:
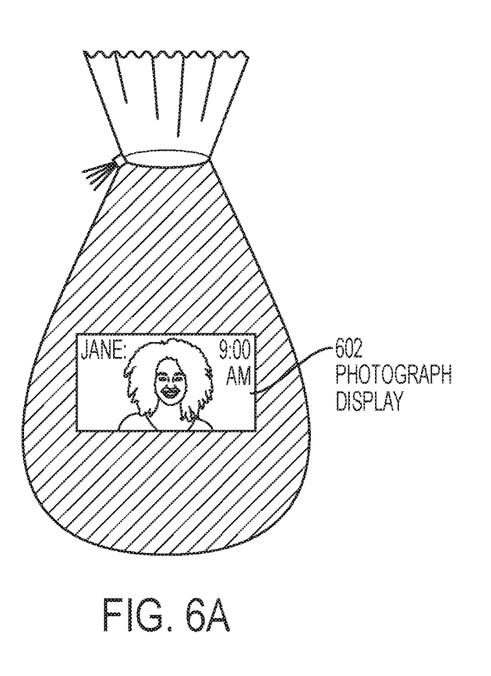
FIGS. 6A-B show several states of yet another illustrative OLED-based currency bag.
Figure 6B:
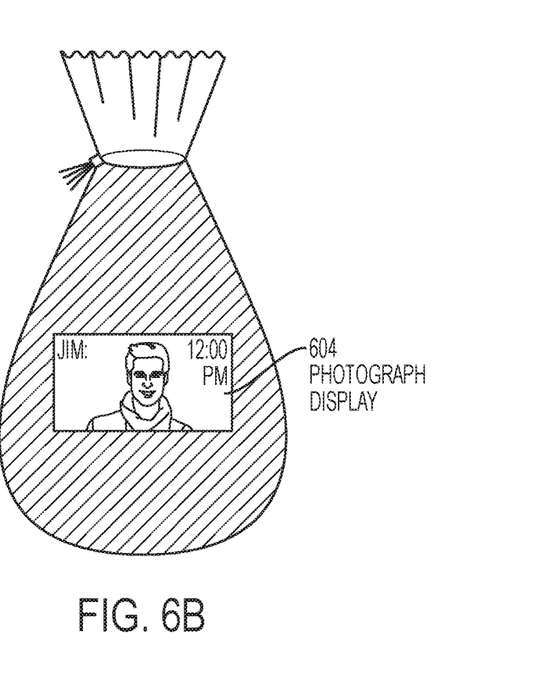

FIGS. 6A-B show several states of a currency deposit bag. FIG. 6A shows an OLED display displaying a photograph, as shown at 602. The display may show a photograph and a name of the person who is expected to pick up the currency deposit bag. The display may show the current time. The display may show any other suitable information. The person handling the bag may view the photograph to ensure that the person receiving the bag matches the photograph on the bag.

The photograph may be received via the communication circuit. In the event that the person expected to receive the bag does not arrive, the handler of the bag may contact the secure entity hub. The secure entity hub may assign another person to receive the bag. The secure entity hub may transmit another photograph of the substitute person to the currency deposit bag, via the communication circuit. FIG. 6B shows displaying another photograph of a substitute person, as shown at 604.

FIGS. 7A-D show several states of a safety deposit box. The safety deposit box may have OLED display 702 permanently affixed to the box. OLED display 702 may form a portion of the safety deposit box.

Figure 7A:
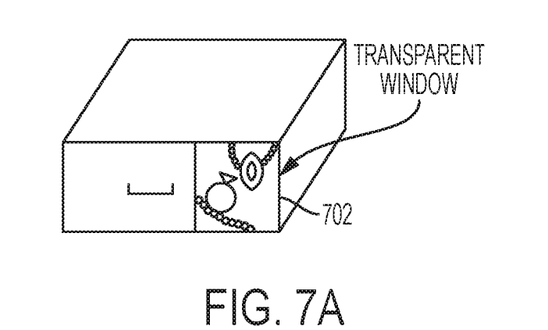
FIGS. 7A-D show several states of an illustrative OLED-based safety deposit box.

FIG. 7A shows OLED display 702 in a transparent mode. The transparent mode may enable a viewer to view contents of the safety deposit box.

Figure 7B:
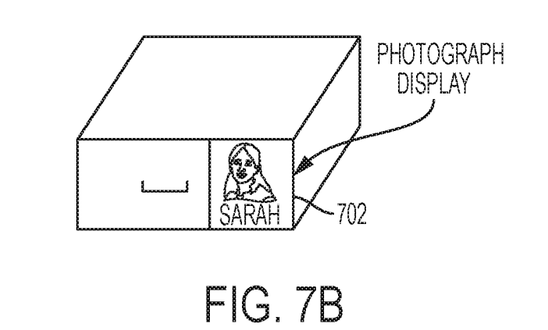
Figure 7C:
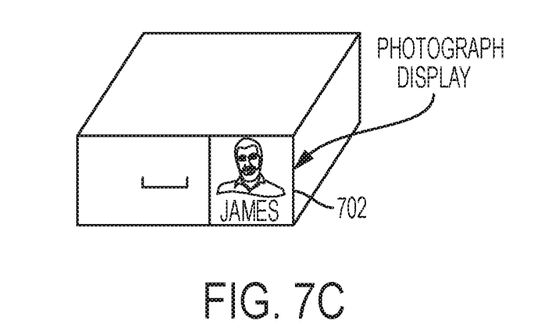

FIGS. 7B and 7C show OLED display 702 in a photograph mode. The changeable photograph display may be configured to display a slide show of persons who have permission to open the safety deposit box.

Figure 7D:
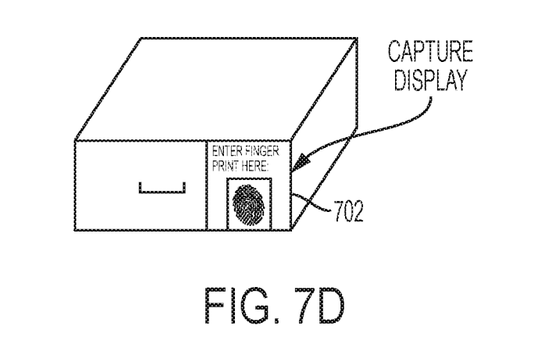

FIG. 7D shows OLED display 702 in a capture display mode. OLED display 702 may enable a user to enter a fingerprint onto OLED display 702.

In some embodiments, a fingerprint may serve as a key to the safety deposit box. Upon entering a fingerprint onto display 702, the fingerprint may be transmitted to a secure entity hub. The secure entity hub may approve the fingerprint. The secure entity hub may transmit the approval to the safety deposit box. The safety deposit box may unlock in response to receipt of the transmitted approval.

In some embodiments, a user may transmit via SMS (short message service), e-mail, or any other means, a message to the safety deposit box. In these embodiments, the safety deposit box may have its own assigned phone number or e-mail address. The safety deposit box may recognize where the transmission originated, and unlock the box in response to receipt of the message.

Figure 8A:
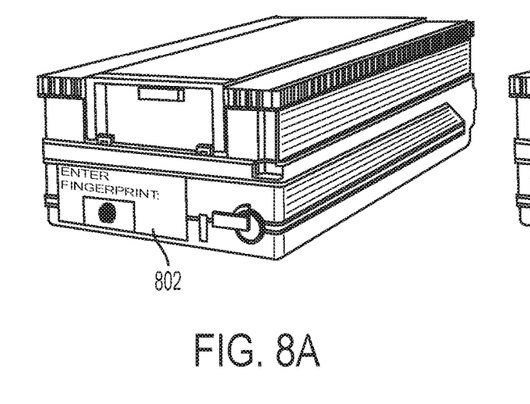
FIGS. 8A-B show several states of an illustrative OLED-based ATM cartridge.
Figure 8B:
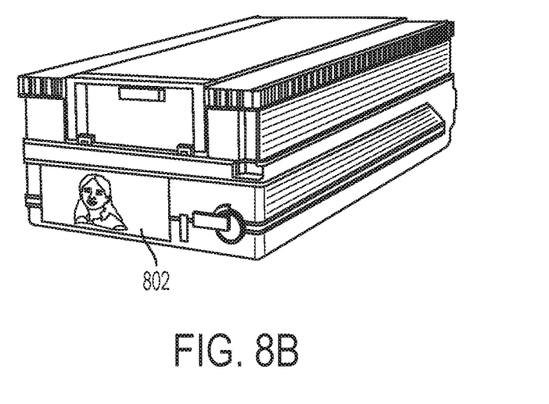

FIGS. 8A-B show several states of a closed ATM cartridge. The ATM cartridge may include OLED display 802 permanently affixed to the side of the cartridge. In some embodiments, OLED display 802 may form a portion of the ATM cartridge.

FIG. 8A shows OLED display 802 instructing a handler to enter his or her fingerprint.

FIG. 8B shows OLED display 802 displaying a photograph of a person to whom the cartridge should be transferred.

Figures 9A, 9B:
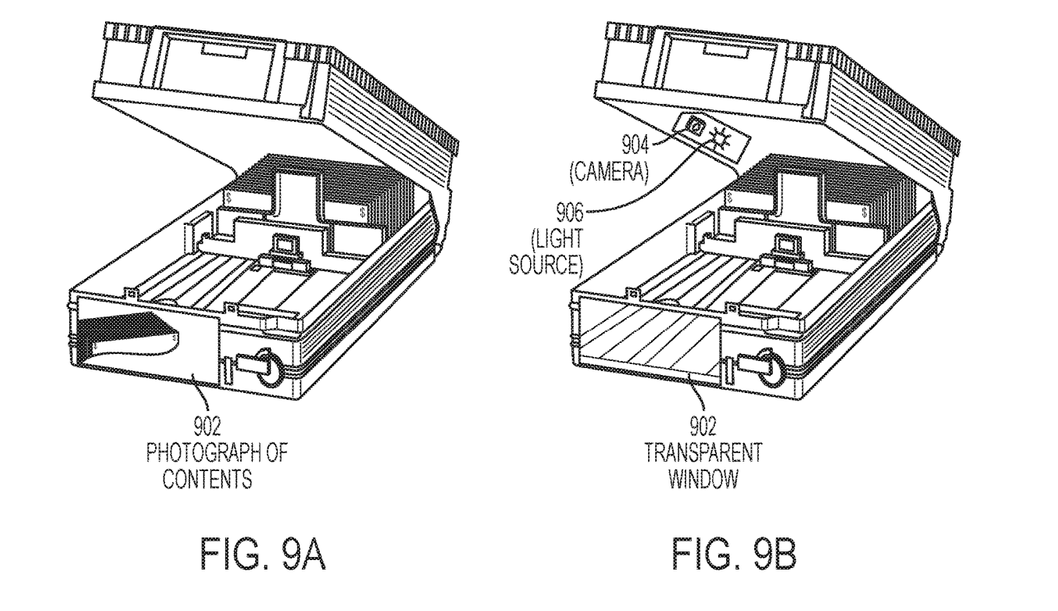
FIGS. 9A-B show several states of another illustrative OLED-based ATM cartridge.

FIGS. 9A-B show several states of an open ATM cartridge. The ATM cartridge may include OLED display 902 preferably permanently affixed to the side of the cartridge. In some embodiments, OLED display 902 may form a portion of the ATM cartridge.

In certain embodiments, the OLED display may be situated on a side of the ATM cartridge. At times, the OLED display located on a side of the ATM cartridge may be transparent. The transparency may enable a viewer external to the cartridge to view contents of the cartridge. The contents of the cartridge may be currency. The transparency may also enable the viewer to determine the number of bills included in the cartridge. In some embodiments, the OLED display may be constructed from fireproof material. This may ensure that the contents of the cartridge survives in the event of a fire.

FIG. 9A shows OLED display 902 display a photograph of the contents of the ATM cartridge. In some embodiments, the OLED display may be removable. In some embodiments, a camera, as shown at 904 (in FIG. 9B) and a light source, as shown at 906 (in FIG. 9B) may photograph the contents of the ATM cartridge. The photograph may then be displayed in OLED display 902.

At times, OLED display 902 may be a transparent window, as shown at 902 in FIG. 9B. This may enable a viewer to view the contents of the ATM cartridge.

Thus, methods and apparatus for OLED-based secure monitoring of valuables are provided. Persons skilled in the art will appreciate that the present invention can be practiced by other than the described embodiments, which are presented for purposes of illustration rather than of limitation, and that the present invention is limited only by the claims that follow.

What is claimed is:

1. A safety deposit box comprising:
a locking internal cavity, said locking internal cavity configured to hold valuables;
an integral organic light emitting diode ("OLED") display permanently affixed to the safety deposit box and viewable form a viewpoint external to the safety deposit box;
a pressure-sensitive portion configured to capture a biometric characteristic;
a software chip configured to store the captured biometric characteristic and a date time value of receipt of the biometric characteristic;
a communication circuit configured to:
transmit the stored biometric characteristic and the date time value of receipt of the biometric characteristic to a secure entity hub; and
receive an approval or denial of the biometric characteristic and the date time value from the secure entity hub;
a battery configured to power the OLED display, the communication circuit, the software chip and the pressure-sensitive portion; and
wherein, based on the approval or denial received at the communication circuit, the safety deposit box is configured to unlock the locking internal cavity or maintain a locked position of the locking internal cavity.

2. The safety deposit box of claim 1, wherein:
the safety deposit box is constructed from opaque material;
the OLED display occupies a portion of the safety deposit box; and
the OLED display is configured to be transparent when idle to enable a user to view contents of the safety deposit box.

3. The safety deposit box of claim 2 further comprising:
a camera positioned in the internal cavity of the safety deposit box;
a light source positioned in the internal cavity of the safety deposit box;
wherein the camera, utilizing the light source, is configured to photograph contents of the internal cavity of the safety deposit box.

4. The safety deposit box of claim 3, wherein the software chip is configured to store a photograph captured by the camera.

5. The safety deposit box of claim 4, wherein the OLED display is configured to display the photograph.

6. The safety deposit box of claim 1, wherein the OLED display is configured to display a photograph of a person who is expected to utilize the safety deposit box.

* * * * *